United States Patent
Mueller et al.

(10) Patent No.: US 9,677,462 B2
(45) Date of Patent: Jun. 13, 2017

(54) VALVE DEVICE FOR A TURBINE OF AN EXHAUST GAS TURBOCHARGER

(71) Applicant: DAIMLER AG, Stuttgart (DE)

(72) Inventors: Markus Mueller, Waiblingen (DE); Cornel Gutmann, Stuttgart (DE); Annette Seeger, Marbach (DE)

(73) Assignee: DAIMLER AG, Stuttgart (DE)

(*) Notice: Subject to any disclaimer, the term of this patent is extended or adjusted under 35 U.S.C. 154(b) by 104 days.

(21) Appl. No.: 14/738,452

(22) Filed: Jun. 12, 2015

(65) Prior Publication Data

US 2015/0275746 A1    Oct. 1, 2015

Related U.S. Application Data

(63) Continuation-in-part of application No. PCT/EP2013/002947, filed on Oct. 1, 2013.

(30) Foreign Application Priority Data

Dec. 12, 2012  (DE) .................. 10 2012 024 300

(51) Int. Cl.
*F02B 37/18* (2006.01)
*F16K 1/22* (2006.01)

(52) U.S. Cl.
CPC ............ *F02B 37/186* (2013.01); *F16K 1/224* (2013.01); *Y02T 10/144* (2013.01)

(58) Field of Classification Search
CPC ....... F02B 37/186; F16K 1/224; Y02T 10/144
See application file for complete search history.

(56) References Cited

U.S. PATENT DOCUMENTS

| 2005/0079049 A1 | 4/2005 | Ishihara et al. |
| 2006/0053789 A1 | 3/2006 | Vogt |
| 2012/0260651 A1 | 10/2012 | Boening et al. |

FOREIGN PATENT DOCUMENTS

| EP | 1939427 | 7/2008 | |
| WO | WO 2011149867 A2 * | 12/2011 | ........... F01D 17/165 |

* cited by examiner

*Primary Examiner* — Audrey K Bradley
(74) *Attorney, Agent, or Firm* — Klaus J. Bach

(57) ABSTRACT

In a valve device for a turbine of an exhaust gas turbocharger having a valve element for adjusting the pressure of the charge air supplied to, and pressurized by, the exhaust gas turbocharger, wherein the valve element is mounted on a shaft which is rotatably supported at a first bearing point on a housing element so that the valve element can be pivoted about an axis of rotation relative to the housing element by an actuating element connected to the shaft adjacent the housing element, the shaft is further supported at a second bearing point which is spaced from the first bearing point and disposed at the side of the actuating element remote from the housing element.

2 Claims, 1 Drawing Sheet

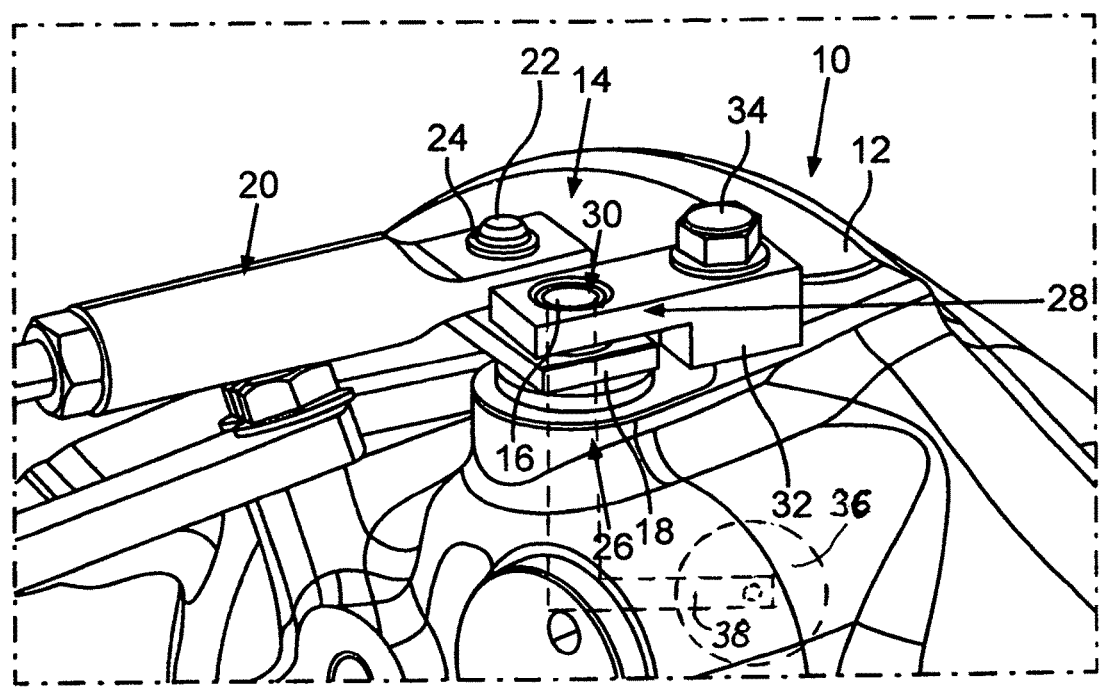

VALVE DEVICE FOR A TURBINE OF AN EXHAUST GAS TURBOCHARGER

This is a Continuation-In-Part application of pending international patent application PCT/EP2013/002947 filed Oct. 1, 2013 and claiming the priority of German patent application 10 2012 024 300.6 filed Dec. 12, 2012.

BACKGROUND OF THE INVENTION

The invention relates to a valve device for a turbine of an exhaust gas turbocharger which has a valve element for adjusting the charge air pressure that is coupled to a shaft to be actuated thereby.

Modern internal combustion engines are ever more frequently fitted with an exhaust gas turbocharger in order to be able to realize efficient and therefore low-fuel-consumption operation and, at the same time, very high specific power and torque generation of the internal combustion engine. The internal combustion engine can be a diesel engine or a spark ignition engine or some other kind of internal combustion engine.

Such an exhaust gas turbocharger usually comprises a turbine with a turbine wheel and a compressor with a compressor wheel for compressing air which is to be fed to the internal combustion engine. The compressor wheel is driven by the turbine wheel. Exhaust gas from the internal combustion engine is fed to the turbine wheel for this purpose. The exhaust gas drives the turbine wheel as a consequence. By this means, energy contained in the exhaust gas is used for driving the turbine and the compressor and therefore for compressing the engine intake air.

The exhaust gas turbocharger usually includes a valve device associated with the turbine for adjusting the charge-air pressure of the exhaust gas turbocharger. The valve device is usually also referred to as a wastegate and includes at least one valve element, by means of which the charge-air pressure can be adjusted.

The valve element is coupled to a shaft of the valve device, wherein the shaft is used to actuate the valve element. At the same time, the valve element is mounted on a bearing point on a housing element, in particular a turbine housing, of the exhaust gas turbocharger, so that it can be rotated about an axis of rotation relative to the housing element by means of the shaft. When the shaft is rotated about the axis of rotation relative to the housing element, this swivels the valve element about the axis of rotation, as a result of which the charge-air pressure is adjusted.

As an example, the valve element is associated with a bypass channel and serves to adjust a quantity or mass of exhaust gas flowing through the bypass channel. The exhaust gas flowing through the bypass channel bypasses the turbine wheel and, consequently, does not flow to the turbine wheel so that the turbine wheel is not driven by the exhaust gas flowing through the bypass channel. Consequently, neither is the exhaust gas flowing through the bypass channel used for compressing the air, as a result of which the charge-air pressure can be adjusted.

Such a valve device for a turbine of an exhaust gas turbocharger can be found disclosed in US 2003/0196435 A1 for example. The valve element is actuated via the shaft, for example by means of a controller or regulator. Actuating the valve element enables the exhaust gas turbocharger to be matched to different operating points of the internal combustion engine so that, as a result, the internal combustion engine can be operated efficiently and with low emissions.

A reduction in fuel consumption and emissions is continuously aimed for as part of the ongoing development of internal combustion engines. This is also accompanied by the valve element being actuated via the shaft very frequently. It has been shown that this results in an increasing load and therefore an increasing wear on the valve device.

It is therefore the object of the present invention to further develop a valve device of the kind mentioned in the introduction in such a way that the load and the resulting wear on the valve device can be kept particularly low in an easy manner.

SUMMARY OF THE INVENTION

In a valve device for a turbine of an exhaust gas turbocharger having a valve element for adjusting the pressure of the charge air supplied to, and pressurized by, the exhaust gas turbocharger, wherein the valve element is mounted on a shaft which is rotatably supported at a first bearing point on a housing element so that the valve element can be pivoted about an axis of rotation relative to the housing element by an actuating element connected to the shaft adjacent the housing element, the shaft is further supported at a second bearing point which is spaced from the first bearing point and disposed at the side of the actuating element remote from the housing element.

The invention provides for valve device for a turbine of an exhaust gas turbocharger, in which loads and wear on the valve device resulting from the actuation of the valve element which is subjected to the hot exhaust gas which is still under pressure can be kept particularly low in an easy and cost-effective manner. The valve element is mounted on at least one second bearing point which is at a distance from the first bearing point so that it can be rotated about the axis of rotation. The at least one second bearing point enables a pivoting of the valve element and in particular of the shaft whereby wear can be kept low.

As a result, the valve element can be pivoted about the axis of rotation frequently and also over a particularly long life span of the valve device without this leading to excessive wear and resulting damage to the valve device. The arrangement provides for a cost-effective adjustment mechanism of the valve element which ensures variable and as-required matching of the exhaust gas turbocharger to different operating points of an internal combustion engine associated with the exhaust gas turbocharger, even over a long life span.

The advantageous mounting of the valve element at the at least two bearing points results in low wear of the valve device without using particularly costly materials and/or without having to provide particularly costly machining methods and treatments of components of the valve device. Rather, inexpensive materials can also be used for mounting the valve element, i.e. for example for the shaft and the housing element, while at the same time fulfilling the functional requirements very reliably.

Further advantages, characteristics and details of the invention will become more readily apparent from the following description of a preferred exemplary embodiment thereof with reference to the accompanying drawing. The characteristics and combinations of characteristics stated below in the description and/or shown in the FIGURES alone can be used not only in the specified combination in each case, but also in other combinations or alone without departing from the scope of the invention.

BRIEF DESCRIPTION OF THE DRAWINGS

The single FIGURE shows, in section, a schematic perspective view of a turbine of an exhaust gas turbocharger having a valve device with a valve element for adjusting the charge-air pressure of the exhaust gas turbocharger, wherein the valve element is mounted on bearing points of which one is spaced apart from the other outside a valve housing with a valve actuating element arranged between the two bearing points.

DESCRIPTION OF A PARTICULAR EMBODIMENT

In a sectional and schematic perspective view, the FIGURE shows a turbine of an exhaust gas turbocharger designated as a whole by the numeral 10. The exhaust gas turbocharger is associated with an internal combustion engine of a motor vehicle, which is not shown in the FIGURE, and serves to supply the internal combustion engine with compressed air. For this purpose, the exhaust gas turbocharger includes a compressor with a compressor wheel which is connected to a rotor shaft of the exhaust gas turbocharger for rotation therewith. By the exhaust gas turbocharger, fresh air can be compressed to a charge-air pressure at which the air is fed to the internal combustion engine.

The turbine 10 includes a turbine housing 12 with a receiving space, which cannot be seen in the FIGURE and in which a turbine wheel of the turbine 10 is accommodated. The turbine housing 12 is a housing element of the exhaust gas turbocharger. The turbine wheel is firmly connected to the rotor shaft. The compressor wheel, the rotor shaft and the turbine wheel are mounted so that they can be rotated about an axis of rotation relative to the turbine housing 12. The turbine housing 12 has at least one feed channel, which cannot be seen in the FIGURE and by way of which exhaust gas from the internal combustion engine is fed to the turbine wheel. The feed channel extends in the circumferential direction of the turbine wheel over its circumference at least substantially in the form of a spiral turbine inlet channel.

The turbine housing 12 also has at least one bypass channel, which cannot be seen in the FIGURE. Exhaust gas can flow through the bypass channel. The exhaust gas flowing through the bypass channel bypasses the turbine wheel. The turbine 10 has a valve device 14 for adjusting the charge-air pressure of the exhaust gas turbocharger. The valve device 14 comprises a valve element 36, which cannot be seen directly in the FIGURE but which is shown by dashed lines and is associated with the bypass channel, for adjusting the charge-air pressure.

The valve element is coupled to a shaft 16 of the valve device 14 by a support arm 38. Here, the shaft 16 serves to actuate the valve element and consequently to adjust the charge-air pressure. The shaft 16 is mounted so that it can be rotated about an axis of rotation relative to the turbine housing 12 using a bushing, which cannot be seen in the FIGURE and is fixed to the turbine housing 12. As the valve element is coupled to the shaft 16, the valve element 36 can be pivoted when the shaft is rotated about the axis of rotation relative to the turbine housing 12. Here, the shaft is at least partially accommodated in the bushing.

In order to rotate the shaft 16 and, consequently, to pivot the valve element 36, a first actuating element in the form of an actuating plate or lever 18 is connected to the shaft 16 for rotation therewith. The shaft 16 passes through a corresponding through-opening of the actuating plate 18. A second actuating element in the form of an actuating rod 20 of the valve device 14 is coupled in an articulated manner to the actuating plate 18. This articulated coupling is effected by means of a bolt element 22, to which the actuating rod 20 is secured in the axial direction of the bolt element 22 by means of a circlip 24.

The actuating rod 20 can be moved along the direction of its longitudinal extension in a translatory manner. As the actuating rod 20 is coupled to the actuating plate 18 at a point which is spaced from the axis of rotation, a translatory movement of the actuating rod 20 is converted into a rotational movement of the shaft 16 about the axis of rotation so that the valve element is swiveled thereby. The actuating plate 18 is usually also referred to as a link lever, as it acts as a lever element to convert the translatory movement of the actuating rod 20 into a rotational movement of the shaft 16.

A quantity or mass of exhaust gas flowing through the bypass channel is adjusted by swiveling the valve element. In a closed position of the valve element, the bypass channel is fluidically blocked, for example, so that exhaust gas cannot flow through the bypass channel. As a result, at least substantially all of the exhaust gas flows to the turbine wheel. By pivoting the valve element into an open position, a controllable amount of exhaust gas can flow through the bypass channel, that is, part of the exhaust gas can be directed through the bypass channel, while another part of the exhaust gas drives the turbine wheel.

The valve element is supported by a first bearing point 26 so that it can be rotated by the shaft 16 about the axis of rotation relative to the turbine housing 12 and the bushing. For avoiding or prevent excessive loads acting on the valve device 14 in an easy and cost-effective manner, even when the valve element is actuated particularly frequently, the valve element is also mounted on another bearing point 28, which is at a distance from the first bearing structure 26, so that the rotatable shaft 16 is rotatably supported at opposite sides of the actuating plate 18 when being rotated about the axis of rotation relative to the turbine housing 12 by the actuating rod 20.

For this purpose, the shaft 16 is accommodated in a sub-region of its longitudinal extension in a receiving opening 30 of a bearing support bracket 32, wherein the receiving opening 30 is in the form of a through-opening. The bearing support bracket is formed separately from the turbine housing 12 and is fixed to the turbine housing 12 by means of a screw 34. As a result, the valve element is supported at a second bearing point 28 by the bearing support bracket 32 so that the valve element can be rotated about the axis of rotation relative to the bearing support bracket 32 by the shaft 16 without bending the shaft 16.

As can be seen from the FIGURE, the actuating plate 18 is arranged in the axial direction of the shaft 16 between the bearing points 26, 28. In other words, the second bearing point 28 is arranged in the axial direction of the shaft 16 outside the actuating plate 18. This limits or prevents wear, in particular of the shaft 16 and of the bushing.

In particular, the actuating plate 18 is coupled to the shaft 16 at a connecting point which lies between the bearing points 26, 28. As a result, an actuating force acting on the shaft 16 via the actuating rod 20 and the actuating plate 18 when the valve element is actuated, is applied to the shaft 16 without generating any bending forces that is without detrimental effects.

Mounting the valve element on the two bearing points 26, 28 provides a constructive way of keeping the loads acting on the valve device 14 low in a cost-effective manner. This enables wear-reducing measures by the use of expensive materials, for example for the bushing and/or for the shaft 16 and/or for the turbine housing 12, to be dispensed with.

LIST OF REFERENCES

10 Turbine
12 Turbine housing
14 Valve device
16 Shaft
18 Actuating plate
20 Actuating rod
22 Bolt element
24 Circlip
26 First bearing point
28 Second bearing point
30 Receiving opening
32 Bearing element
34 Screw

What is claimed is:

1. A valve device (14) for a turbine (10) of an exhaust gas turbocharger, the valve device (14) comprising:
   a first bearing point (26) on a housing (12) of the turbine (1),
   a valve element (36) for adjusting a charge-air pressure of the exhaust gas turbocharger,
   a shaft (16) coupled to the valve element (36) for pivoting the valve element (36),
   an actuating plate (18) mounted on the shaft (16),
   a second bearing point (28) provided by a bearing support bracket (32) which is formed separately from the housing (12) but which is fixed to the housing (12), the second bearing point (28) being spaced from the first bearing point (26) and arranged outside the housing (12) at a side of the actuating plate (18),
   whereby the shaft (16) is pivotally supported at the first bearing point (26) and the second bearing point (28) at opposite sides of the actuating plate (18) so that the valve element (36) can be pivoted about an axis of rotation relative to the housing (12) by the actuating plate (18).

2. The valve device (14) as claimed claim 1, wherein the actuating plate (18) of the valve device (14) is a lever coupled to the shaft (16).

* * * * *